US 6,671,320 B1

(12) United States Patent
Beacken et al.

(10) Patent No.: US 6,671,320 B1
(45) Date of Patent: Dec. 30, 2003

(54) CIF TO QCIF VIDEO BITSTREAM DOWN CONVERSION

(75) Inventors: Marc Jay Beacken, Randolph, NJ (US); Kyeong Ho Yang, Freehold, NJ (US); Wenwu Zhu, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 580 days.

(21) Appl. No.: 09/596,379

(22) Filed: Jun. 16, 2000

(51) Int. Cl.[7] .................................................. H04N 7/18
(52) U.S. Cl. .......................... 375/240.16; 375/240.18; 375/240.21
(58) Field of Search ................. 375/240.02–240.18, 375/240.21; 348/440–449

(56) References Cited

U.S. PATENT DOCUMENTS

| | | | | |
|---|---|---|---|---|
| 6,343,098 B1 | * | 1/2002 | Boyce | 375/240.03 |
| 6,434,197 B1 | * | 8/2002 | Wang et al. | 375/240.29 |
| 6,526,099 B1 | * | 2/2003 | Christopoulos et al. | 375/240.26 |

OTHER PUBLICATIONS

ITU–T Recommendation H.261, Video Codec for Audiovisual Services at p x 64 kbit/s; Mar. 1993; pp. 1–25.
Shaw–Min Lei, Ting–Chung Chen, and Ming–Ting Sun, "Video Bridging Based on H.261 Standard;" 1994 IEEE; pp. 425–437.
Ut–Va Koc and K.J. Ray Liu, "DCT–Based Motion Estimation;" 1998 IEEE; pp. 948–965.
M.H. Willebeek–LeMair, D.D. Kandlur and Z.Y. Shae, "On Multipoint Control Units for Videoconferencing;" 1994 IEEE; pp. 356–364.
Shih–Fu Chang and David G. Messerschmitt, "Manipulation and Compositing of MC–DCT Compressed Video;" 1995 IEEE; pp. 1–11.
Neri Merhav and Vasudev Bhaskaran, "Fast Algorithms for DCT–Domain Image Down–Sampling and for Inverse Motion Compensation;" 1997 IEEE; pp. 468–476.
Draft ITU–T Recommendation H.263, "Video Coding for Low Bit Rate Communication," May 1996; pp. 1–155.
Andy C. Hung, "PVRG–JPEG Codec 1.1;" Nov. 17, 1993; pp. 1–56.

* cited by examiner

Primary Examiner—Andy Rao

(57) ABSTRACT

A system and method to convert a CIF compressed video to a QCIF video bitstream provides compatibility between the various digital video sources and application uses. A coding mode and a motion vector for a macroblock in a QCIF video sequence are selected from those of a corresponding CIF video sequence without motion estimation.

7 Claims, 3 Drawing Sheets

CIF TO QCIF VIDEO BITSTREAM DOWN CONVERSION

FIELD OF THE INVENTION

This invention relates to video systems and more particularly to digital video.

BACKGROUND OF THE INVENTION

Presently, there is extensive interest in advanced video services using technologies of digital signal processing, VLSI, and packet networkings. Examples of these services include video on the Internet, videoconferencing, interactive network video, video editing/publishing, and virtual video library/store. For many digital video applications, compressed video bitstreams are usually transmitted over networks and/or stored in tapes or databases in Common Intermediate Format (CIF) or Quarter Common Intermediate Format (QCIF).

Various digital video applications utilize CIF and QCIF digital formats. For example, in multi-point videoconferencing over networks, multi-point control unit (MCU) receives QCIF compressed video bitstreams from several users, combines them into one CIF video, down converts it into QCIF video, encodes it, and sends the QCIF video bitstream to all the users. There is a need to down convert a CIF compressed video to a QCIF video bitstream to provide compatibility between the various digital video sources and application uses.

SUMMARY OF THE INVENTION

The present invention is a system and method to convert a CIF compressed video to a QCIF video bitstream. A coding mode and a motion vector for a macroblock in a QCIF video sequence are selected from those of a corresponding CIF video sequence without motion estimation.

BRIEF DESCRIPTION OF THE DRAWING

A more complete understanding of the present invention may be obtained from consideration of the following description in conjunction with the drawing, in which.

DESCRIPTION OF THE PREFERRED EMBODIMENTS

Digital video is utilized in a great variety of applications including video on the Internet, videoconferencing, interactive network video, video editing/publishing, and video libraries. Many advanced video applications require converting a compressed video bitstream from CIF (Common Intermediate Format) to QCIF (Quarter Common Intermediate Format). The conversion task can be performed in the pixel domain or in the discrete cosine transform (DCT) domain. The present invention utilizes the DCT-domain processing for H.261 video bitstream down-conversion, which requires lower complexity than that in the pixel domain. The present invention utilizes a scheme to select a coding mode and a motion vector for a macroblock (MB) in a QCIF video sequence from those of the corresponding CIF video without motion estimation (ME).

Figure 1:
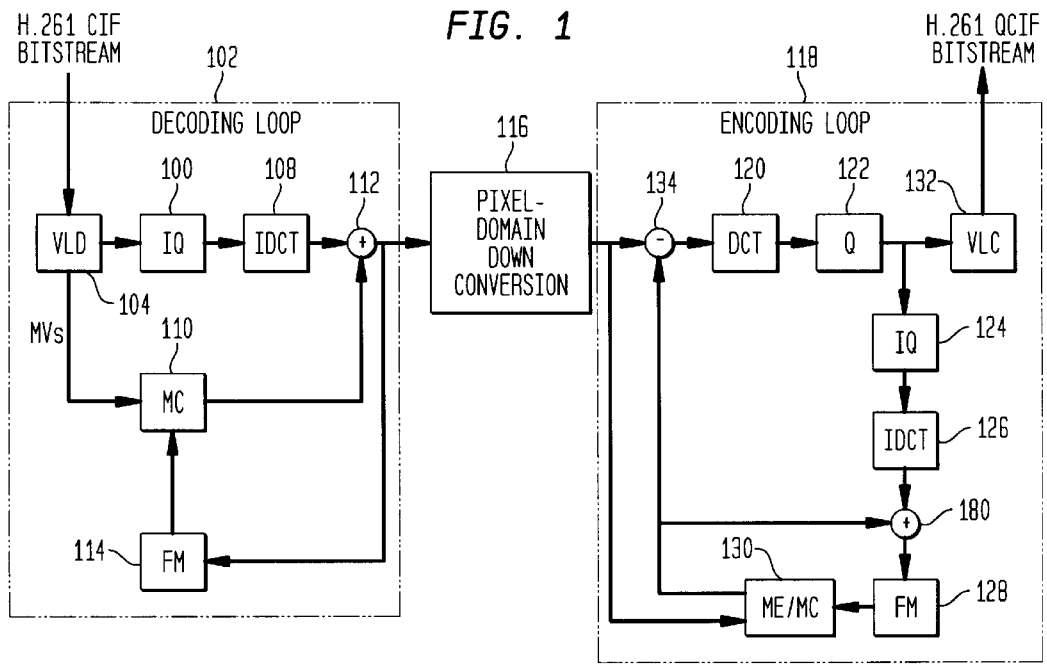
FIG. 1 shows a functional block diagram of a pixel-domain CIF to QCIF down-conversion scheme.

There are two possible domains to perform down-conversion for H.261 bitstream: discrete cosine transform (DCT) domain and pixel domain. Referring to FIG. 1 there is illustrated a pixel-domain CIF-to-QCIF down-conversion scheme. The decoding loop 102 performs variable length decoding (VLD) 104, inverse quantization (IQ) 106, Inverse discrete cosine transform (IDCT) 108, and motion compensation (MC) 110 which is added to the output of the IDCT 108 by adder 112. The output of adder 112 is coupled to frame memory (FM) 114, which is coupled to MC 110. Output of the adder 112 is then coupled to pixel domain down converter 116. The encoding loop 118 is composed of DCT 120, quantization (Q) 122, IQ 124, IDCT 126, FM 128, ME/MC 130 and variable length coding (VLC) 132. The output of the ME/MC 130 is coupled to adder 132 and subtracter 134. The output of pixel domain down converter 116 is coupled to the subtracter 134 and the ME/MC 130. Output of the adder 132 is coupled to FM 128, which is coupled to ME/MC 130. Output of the subtracter 134 is coupled to DCT 120, which is coupled to Q 122. The output of Q 122 is coupled to VLC 132 and IQ 124.

Figure 2:
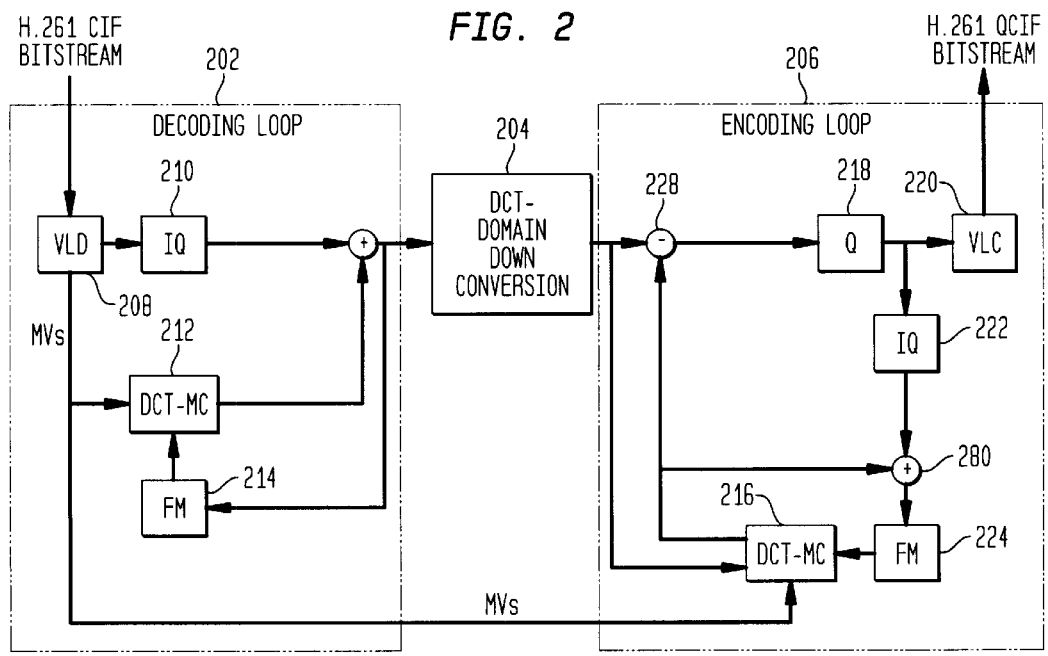
FIG. 2 shows a functional block diagram of a CIF to QCIF down-conversion scheme in the DCT domain.

Referring to FIG. 2 there is shown a diagrammatic representation of the present invention DCT-domain down-conversion system. It consists of decoding loop 202, DCT-domain down sampling 204 and encoding loop 206. In the DCT-domain decoding loop 202, besides VLD 208 and IQ 210, which are the same as in the pixel-domain decoding loop 102, MC is performed in the DCT domain (DCT-MC) 212. In the DCT-domain down-conversion loop 204, the down-conversion is performed on an MB by MB basis. More specifically, four 8×8 luminance (Y) blocks are scaled down to one 8×8 Y block while two chrominance blocks (Cr and Cb for 4:1:1 format) are kept unchanged. Once all four adjacent macroblocks are available, the four 8×8 Cr or Cb blocks are down converted to one 8×8 Cr or Cb block, respectively. The DCT-domain encoding loop 206 is also different from that of the pixel-domain approach. It performs DCT-MC 216 instead of doing DCT and IDCT pair, and ME in the pixel domain.

Referring to FIG. 1 in conjunction with FIG. 2, it can be seen that the DCT-domain down-conversion approach has the advantage of lower complexity than that in the pixel domain. This is because DCT, IDCT, and ME, which are computationally expensive for the pixel-domain approach, are saved for the DCT-domain approach. Accurate quantitative comparison of complexity between DCT- and pixel-domain approaches is very difficult since the complexity for the DCT-domain approach is highly dependent on the characteristics of a particular video sequence. According to reported results, the complexity of DCT-MC and/or DCT-domain down sampling is comparable to that of DCT (and/or IDCT) used in the pixel-domain approach when exploiting the sparseness of quantized DCT coefficients and zero motion vector distribution in DCT-MC and DCT-domain down sampling. Notice that for an 8×8 DCT block most high frequency coefficients are quantized to zero, and a large percentage of motion vectors are zero for the head-shoulder video sequences. These result in significant computational savings. When counting the computation from ME of the pixel-domain method, which usually requires lots of computation, the overall computational saving of DCT-domain approach is very large.

Figure 3:
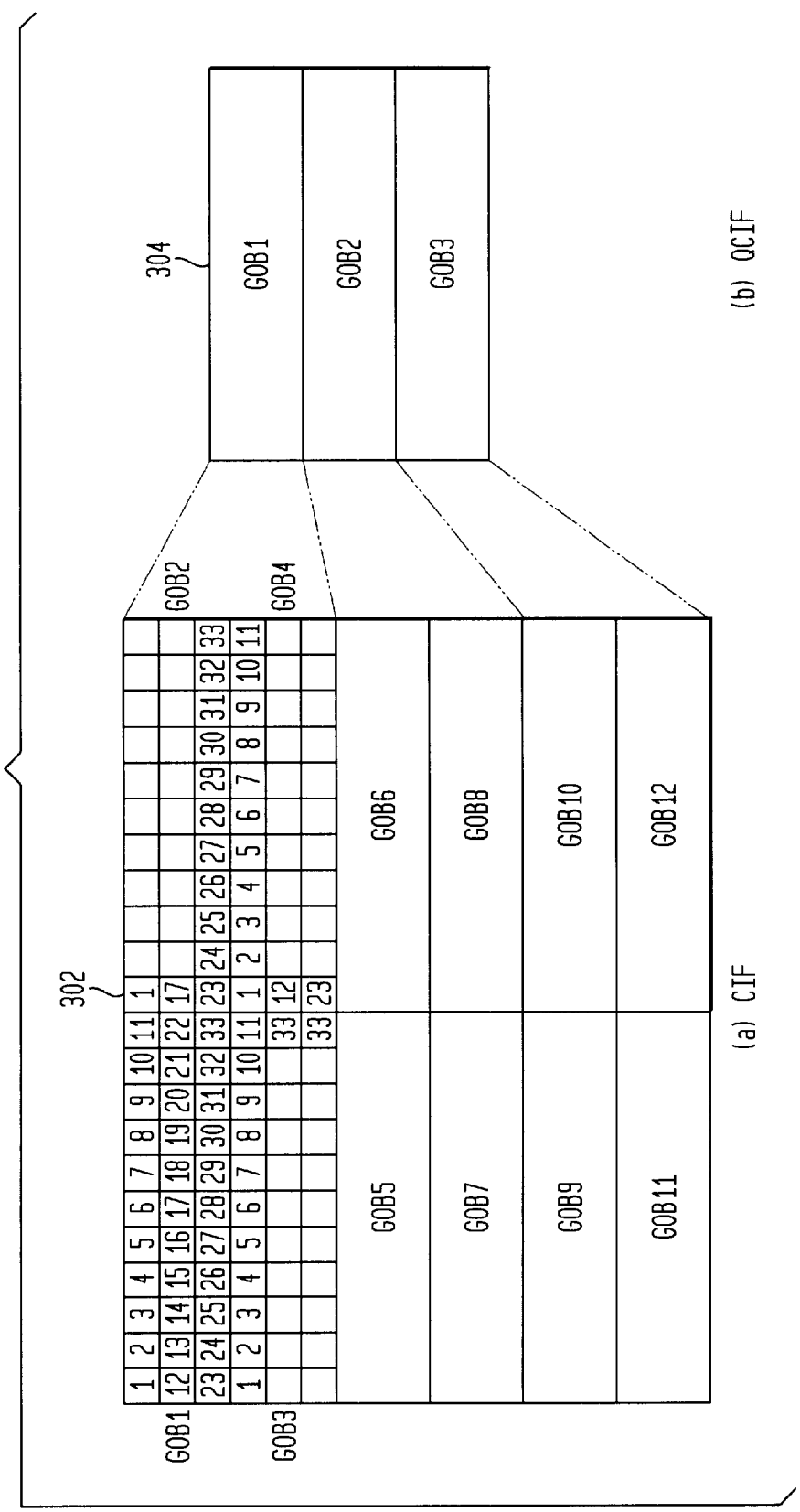
FIG. 3 shows a diagrammatic representation of GOBs mapping from a CIF format to a QCIF format using the H.261 standard; and, FIG. 4 shows a functional flow chart for selecting the coding mode and the motion vector.

Referring to FIG. 3 there is illustrated a scheme to select a coding mode and a motion vector for an MB. The proposed DCT-domain CIF-to-QCIF down converter is based on the H.261 video compression standard. In the H.261 standard, a CIF frame consists of 12 Group of Blocks (GOBs) 302 and a QCIF frame is composed of 3 GOBs 304. A GOB consists of 33 Mbs. In order to perform CIF-to-QCIF down-conversion, four GOBs in CIF format have to be mapped to one GOB in QCIF format. For the pixel-domain down-conversion approach, this can be done by scaling every 8×8 block in CIF format down to a 4×4 block in QCIF format. For the DCT-domain approach, the down-conversion has to be performed from four 8×8 blocks in CIF format to an 8×8 block in QCIF format, as stated above.

Once the DCT coefficients of each block for the QCIF video are available after down-conversion, compose the four blocks to generate a new MB. To encode the MB, a motion vector and a coding mode should be determined. Although this can be done by ME in the DCT domain, it is computationally much more efficient to obtain the motion vector from those of the CIF video. The new motion vector can be inferred from the four motion vectors of the CIF video by taking there mean or median. However, we found that for many MBs, the inferred motion vectors even result in worse prediction performance than the zero motion vector.

Figure 4:
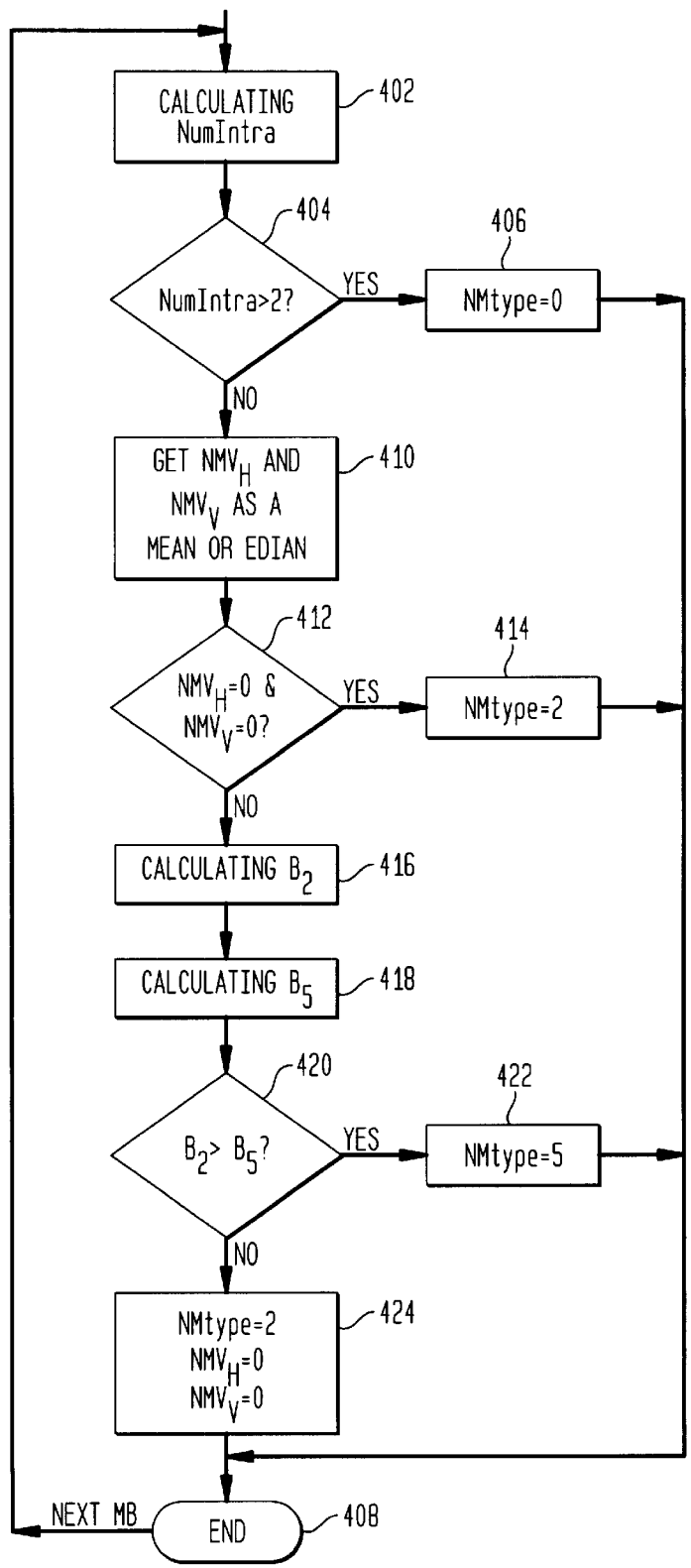

To solve this problem, we propose a new scheme to select the MB coding mode and the motion vector. Let $NMV_H$, $NMV_V$, and NMtype represent the horizontal and vertical components of a motion vector and the coding mode of the MB of the QCIF video, respectively. Denote Mtype [i], i=1,2,3,4, as coding modes for the four MBs of the CIF video. Let $MV_H[i]$, and $MV_V[i]$, i=1,2,3,4, denote the horizontal and vertical components of a motion vector, respectively. Note that a typical coding mode in the H.261 standard is 0 or 2 or 5, which respectively means that the corresponding MB is encoded by using intra-frame coding, inter-frame coding without MC, and motion compensated inter-frame coding. Then choose the coding mode and the motion vector for the new MB as follows (refer to FIG. 4):

Step 1: In step 402, count NumIntra the number of MBs with Mtype[i]=0, i=1, 2, 3, 4.

Step 2: In step 404, check if NumIntra>2. If NumIntra>2, go to step 406 and set Nmtype to 0, then go to END (step 408). Otherwise, continue.

Step 3: In step 410, infer the new motion vector as $$(NMV_H, NMV_V) = \left(\frac{1}{4}\sum_{i=1}^{4} MV_H[i], \frac{1}{4}\sum_{i=1}^{4} MV_V[i]\right), \quad (1)$$

or $$(NMV_H, NMV_V) = (\text{median}\{MV_H[i], i=1,2,3,4\}, \text{median}\{MV_V[i], i=1,2,3,4\}), \quad (2)$$

where median represents the median of the elements. Test in step 412 if $NMV_H=0$ and $NMV_V=0$, then in step 414, set NMtype to 2 and go to END 408. Otherwise, continue.

Step 4: Get six DCT prediction error blocks without MC and count the number of bits $B_2$ required to encode them in step 416.

Step 5: Do DCT-MC using the motion vector obtained using Eq. (1), and then count the number of bits, $B_5$, required to encode the MC prediction error blocks in step 418.

Step 6: Test in step 420 if $B_2>B_5$, then in step 422 set NMtype to 5. Otherwise in step 424, set NMtype to 2, and $NMV_H=NMV_V=0$. Go to END 408.

END: If MBA (MB address) is less than 33, go to the next MB. Otherwise, go to the next GOB.

One advantage of this scheme is that we perform DCT-MC only on MBs with $NMV_H \neq 0$ or $NMV_V \neq 0$ in Step 3. The computational saving can be clearly seen. Another advantage is using brute-force mode determination to achieve the best result with a little additional computation. This is because the DCT coefficients are already obtained and thus there is no need to perform DCT. The brute-force method presented here requires even less complexity than calculating the variance of the error block.

After the above process, the resulting DCT coefficients are quantized and variable length coded to generate a QCIF bitstream.

Numerous modifications and alternative embodiments of the invention will be apparent to those skilled in the art in view of the foregoing description. The proposed approach can be applied to QCIF to QCIF video bridging for video-conferencing. In addition, it can also be applied to H.263 baseline code with some modifications. Accordingly, this description is to be construed as illustrative only and is for the purpose of teaching those skilled in the art the best mode of carrying out the invention. Details of the structure may be varied substantially without departing from the spirit of the invention and the exclusive use of all modifications, which will come within the scope of the appended claims, is reserved.

What is claimed:

1. A method for converting a CIF compressed video to a QCIF video bitstream, the method comprising the steps of:

selecting a coding mode for a macroblock in a QCIF video sequence without motion estimation;

selecting a motion vector for a macroblock in a QCIF video sequence without motion estimation;

wherein said selected coding mode and said selected motion vector correspond to a QCIF video sequence and said selected motion vector is represented by a horizontal component $NMV_H$ that is proportional to a first summation of a horizontal component $MV_H[i]$ and a vertical component $NMV_V$ that is proportional to a second summation of a vertical component $MV_V[i]$, said horizontal and vertical components $MV_H[i]$, $MV_V[i]$, representing a horizontal and a vertical component of a motion vector associated with a coding mode i and said first and second summations are carried out over a plurality of coding modes indexed by i; and performing DCT-MC and accessing six DCT prediction error blocks without MC based on determining if at least one of said $NMV_H$ and said $NMV_V$ have a non-zero value.

2. The method of claim 1, wherein said selected motion vector is represented by $$(NMV_H, NMV_V) = \left(\frac{1}{4}\sum_{i=1}^{4} MV_H[i], \frac{1}{4}\sum_{i=1}^{4} MV_V[i]\right).$$

3. The method as recited in claim 1 further comprising the additional step of counting a number of bits $B_2$ required to encode said six DCT prediction error blocks.

4. The method as recited in claim 3 further comprising the step of performing motion compensation in a discrete cosine transform domain (DCT-MC).

5. The method as recited in claim 4 further comprising the step of perorming said DCT-MC using relationship $$(NMV_H, NMV_V) = \left(\frac{1}{4}\sum_{i=1}^{4} MV_H[i], \frac{1}{4}\sum_{i=1}^{4} MV_V[i]\right).$$

6. The method as recited in step 4 further comprising the step of counting a number of bits ($B_5$) required for encoding said six DCT prediction error blocks obtained by said DCT-MC.

7. The method as recited in step 6 further comprising the step of determining if said $B_2$ is greater than said $B_5$ and, if it is so determined, then selecting an inter-frame coding mode that includes motion compensation, but if it is not so determined, then selecting an inter-frame coding mode that does not include motion compensation.

\* \* \* \* \*